US009492882B2

(12) United States Patent
Koike et al.

(10) Patent No.: US 9,492,882 B2
(45) Date of Patent: Nov. 15, 2016

(54) PLASMA CUTTING METHOD AND PLASMA CUTTING APPARATUS

(75) Inventors: Tetsuo Koike, Tokyo (JP); Akira Furujo, Tokyo (JP); Ryuta Hirai, Tokyo (JP)

(73) Assignee: KOIKE SANSO KOGYO CO., LTD., Tokyo (JP)

( * ) Notice: Subject to any disclaimer, the term of this patent is extended or adjusted under 35 U.S.C. 154(b) by 1239 days.

(21) Appl. No.: 12/444,673

(22) PCT Filed: Oct. 12, 2007

(86) PCT No.: PCT/JP2007/069912
§ 371 (c)(1),
(2), (4) Date: Mar. 10, 2010

(87) PCT Pub. No.: WO2008/044756
PCT Pub. Date: Apr. 17, 2008

(65) Prior Publication Data
US 2010/0176096 A1    Jul. 15, 2010

(30) Foreign Application Priority Data
Oct. 12, 2006  (JP) ................. 2006-278454

(51) Int. Cl.
*B23K 10/00* (2006.01)
(52) U.S. Cl.
CPC .............. *B23K 10/00* (2013.01); *B23K 10/006* (2013.01); *B23K 2201/18* (2013.01); *B23K 2203/04* (2013.01)
(58) Field of Classification Search
USPC ............ 219/121.11, 121.36, 121.39, 121.44, 219/121.4–121.42, 121.54, 121.56, 121.59, 219/121.67
See application file for complete search history.

(56) References Cited

U.S. PATENT DOCUMENTS

| 6,130,405 A * | 10/2000 | Loringer .............. B23K 26/046 219/121.71 |
| 2003/0000928 A1* | 1/2003 | Forlong ................... 219/121.39 |
| 2005/0077271 A1* | 4/2005 | Delzenne ................ 219/121.44 |
| 2006/0291971 A1* | 12/2006 | Tanoue et al. ................ 409/202 |

FOREIGN PATENT DOCUMENTS

| FR | 2830476 A1 | 4/2003 |
| JP | 59-229262 A | 12/1984 |
| JP | 61-206562 A | 9/1986 |
| JP | 61206562 A | 9/1986 |
| JP | 02-251376 A | 10/1990 |
| JP | 2251376 A | 10/1990 |

OTHER PUBLICATIONS

Supplementary European Search report issued on Apr. 14, 2011, in corresponding European Application No. 07829648.0-1262.

* cited by examiner

*Primary Examiner* — Brian Jennison
(74) *Attorney, Agent, or Firm* — Shlesinger, Arkwright & Garvey LLP

(57) ABSTRACT

The present invention relates to a cutting method for cutting an upper edge and a lower edge of a cutting plane into a curved shape, when a cutting object is cut by supplying plasma gas to the periphery of an electrode of a plasma torch and ejecting plasma arc from a nozzle. In order to melt the upper edge and the lower edge of the cutting plane to form a curved shape, at least one condition selected from plural conditions including a cutting electric current, cutting speed, height of a plasma torch, angle of the plasma torch, and flow rate of plasma gas upon performing the vertical cutting for forming the upper edge and the lower edge of the cutting object substantially at right angles is changed.

1 Claim, 4 Drawing Sheets

PLASMA CUTTING METHOD AND PLASMA CUTTING APPARATUS

TECHNICAL FIELD

The present invention relates to a cutting method for cutting an upper edge and a lower edge of a cutting plane in a curved shape, when a cutting object represented by a steel plate is cut, and a plasma cutting apparatus that can selectively perform a cutting in which the upper edge and the lower edge of the cutting plane is cut in a curved shape, a cutting in which the cutting plane is vertically cut, and a bevel cutting.

BACKGROUND ART

An iron and steel structure represented by a bridge, for example, is formed in such a manner that a cutting member obtained by cutting a steel plate in a desired shape is welded to form a great number of structural members, and these structural members are assembled. Therefore, the end portion of the cutting member, which constitutes the individual structural member, is classified into a welded surface that is welded to the other cutting member and an exposed surface that is exposed without being welded.

The cutting member of the structural member constituting the iron and steel structure is cut by employing a gas cutting method or a plasma cutting method. In this case, a bevel cutting by which an angle according to the thickness of the cutting member is provided is performed to the portion that is to become the welded surface, while a vertical cutting by which the cutting plane is vertical to the surface of the steel plate is performed to the exposed surface. When the target cutting member is welded to the member to which a rib has already been welded and has a function of avoiding the rib, in particular, the bevel cutting and the vertical cutting are continuously performed in one cutting process (one cutting line).

On the other hand, since almost all parts of the structural member are exposed to air in the iron and steel structure, the surface is coated so as to prevent the generation of rust. In this case, the exposed surface is also coated. However, the exposed surface is formed by vertically cutting the steel plate, so that the intersection (edge) of the cutting plane constituting the exposed surface and the front and backside surfaces of the steel plate is substantially at right angles. Accordingly, there arises a problem that the coated film is easy to be separated from this edge.

In order to prevent the coated film from being separated from the edge between the exposed surface and the front and backside surfaces, the edge is formed to have a dull angle by the execution of secondary fabrication by means of a sander or a chamfering machine along the exposed surface, and then, the resultant is coated.

DISCLOSURE OF THE INVENTION

Much time and great labor are needed to perform the secondary fabrication to the upper and the lower edges of the cutting member, which is cut from the steel plate, along the exposed surface as described above. Particularly, an operator has to manually perform the secondary fabrication by means of the sander to the exposed surface formed for avoiding the rib or the exposed surface made of a curved line, such as a manhole or a hole for piping. This becomes a significant problem in shortening the work period.

An object of the present invention is to provide a plasma cutting method for cutting an upper edge and a lower edge of a cutting plane in a curved shape during the step of cutting the cutting object with a plasma torch, and a plasma cutting apparatus that can selectively perform, to the cutting object, a vertical cutting, a bevel cutting, and a cutting for forming the upper and lower edges of the cutting plane into a curved shape.

In order to solve the above-mentioned problem, the cutting method according to the present invention is for cutting an upper edge and a lower edge of a cutting plane into a curved shape when a cutting object is cut by supplying plasma gas to the periphery of an electrode of a plasma torch and ejecting plasma arc from a nozzle, wherein, in order to melt the upper edge and the lower edge to form a curved shape, at least one condition selected from plural conditions including a cutting electric current, cutting speed, height of a plasma torch, angle of the plasma torch, and flow rate of plasma gas upon performing the vertical cutting for forming the upper edge and the lower edge of the cutting object substantially at right angles is changed.

A plasma cutting apparatus according to the present invention includes a plasma torch that supplies plasma gas to the periphery of an electrode and ejects plasma arc from a nozzle for cutting a cutting object; a moving device that moves the plasma torch in accordance with a target cutting path; and a control device that controls a cutting electric current to be applied to the electrode of the plasma torch, the flow rate of the plasma gas, the moving speed of the plasma torch, the height of the plasma torch from the cutting object, and a tilt angle of the plasma torch with respect to the cutting object, the apparatus vertically cutting the cutting object, or vertically and bevely cutting the cutting object, or bevely cutting the cutting object, wherein the control device includes a storage unit that stores the cutting condition including the cutting electric current, the cutting speed, the height of the plasma torch, the angle of the plasma torch, and the flow rate of the plasma gas upon cutting the upper edge and the lower edge of the cutting plane into a curved shape, an input device that designates an area where the upper edge and the lower edge of the cutting plane are cut into a curved shape in the shape to be cut, and a determination unit that determines the area, which is designated by the input device and where the upper edge and the lower edge of the cutting plane are cut into the curved shape.

In the plasma cutting method according to the present invention, at least one condition selected from the plural conditions including a cutting electric current, cutting speed, height of a plasma torch, angle of the plasma torch, and flow rate of plasma gas upon performing the vertical cutting for forming the upper edge and the lower edge of the cutting object substantially at right angles is changed in order to forcibly melt the upper edge and the lower edge of the cutting plane. With this process, the upper edge and the lower edge can be cut (hereinafter referred to as "R-cutting") into a curved shape.

In the plasma cutting apparatus according to the present invention, the storage unit in the control device stores beforehand the cutting condition including the cutting electric current, the cutting speed, the height of the plasma torch, the angle of the plasma torch, and the flow rate of the plasma gas upon performing the R-cutting. The input device designates the area that is R-cut in the shape to be cut, and the determination unit determines the R-cut area designated by the input device. Accordingly, when the plasma torch reaches the area to be R-cut during the plasma cutting to the cutting object, the cutting condition for the R-cutting is read, whereby the R-cut can be performed.

Therefore, the cutting plane can be continuously cut by selectively combining the vertical cutting, bevel cutting and R-cutting at the desired area on the cutting line on the target cutting path.

EXPLANATION OF REFERENCE NUMERALS

Figure 1:
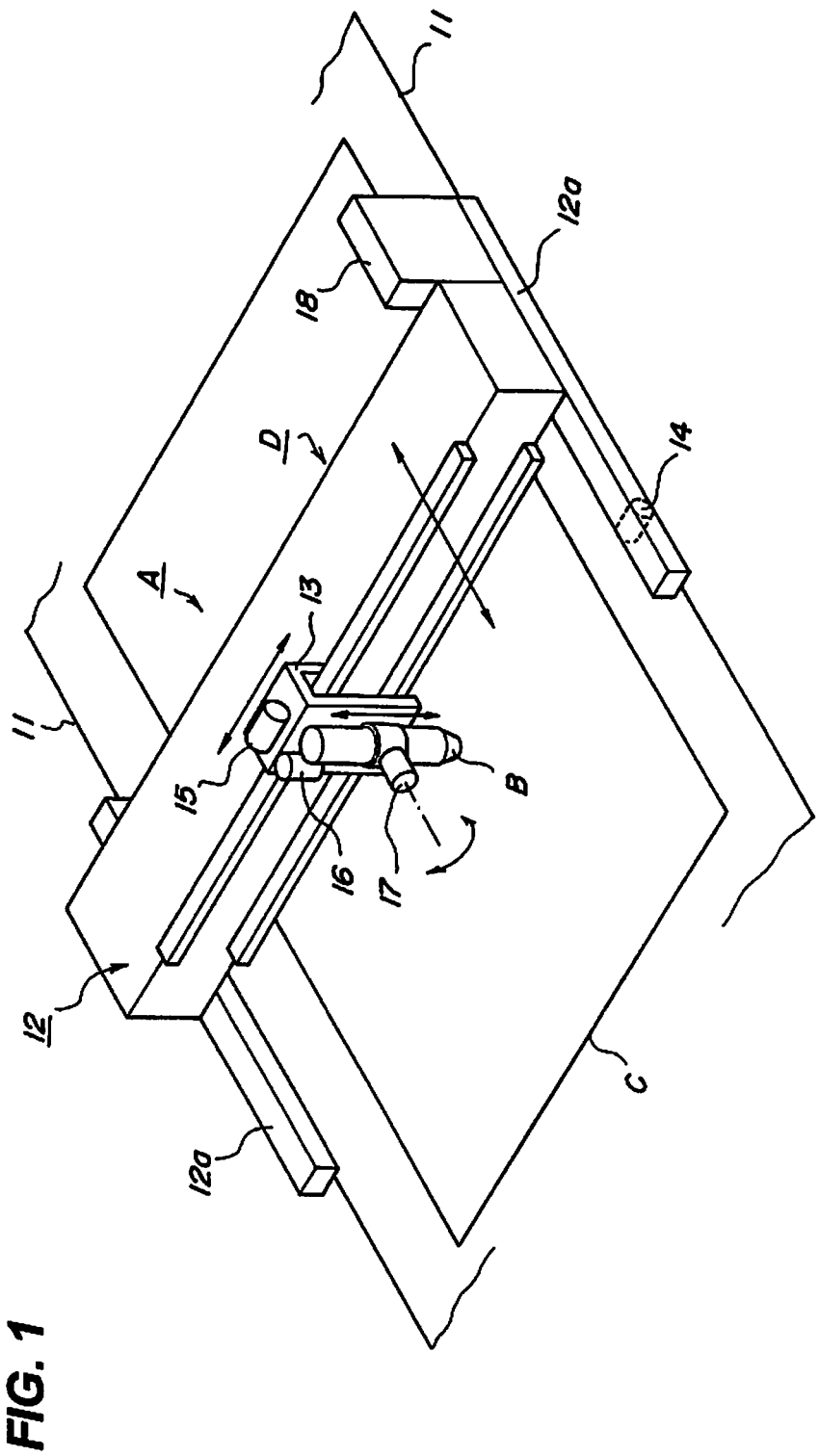
FIG. 1 is a schematic view illustrating a structure of a cutting apparatus.

A Cutting apparatus
B Plasma torch
C Cutting object
D Moving device
1 Electrode
2 Nozzle
3 Shield nozzle
2a, 3a Flow path
2b, 3b Hose
2c, 3c Electromagnetic valve
2d, 3d Flow rate controller, Gas flow rate control device
4 Torch body
5 Gas feeding device
6a, 7a Conductive member
6b, 7b Cabtire
8 Power source
11 Rail
12 Frame
13 Traverse carriage
14 Travel motor
15 Traverse motor
16 Vertical motor
17 Torch angle shaft motor
18 Control board
21 Control device
21a Operation unit
21b Program storage unit
21c Temporary storage unit
21d Determination unit
21e Input/output unit
22 Input device
31 to 33 Cutting plane
31a to 33a Upper edge
31b to 33b Lower edge

BEST MODE FOR CARRYING OUT THE INVENTION

A preferred embodiment of a plasma cutting method (hereinafter referred to as "cutting method") and a plasma cutting apparatus (hereinafter referred to as "cutting apparatus") according to the present invention will be described below.

According to the cutting method of the present invention, an upper edge and a lower edge of a cutting plane is cut into an R shape when a cutting object is cut. In general, it is demanded that the upper edge of the cutting plane is practically at right angles to the surface in a plasma cutting.

On the other hand, in the present invention, the upper edge and the lower edge of the cutting plane are positively cut into an R-shape. When the exposed surface of the cut material is coated, the R-shaped upper and lower edges can prevent the coated film from being separated from these edges.

In the present invention, cutting the upper edge and the lower edge of the cutting plane in a curved shape is not limited to a thermochemical cutting, but includes the case in which a base material present at the upper and the lower edges is melted with heat of the plasma arc, by which the upper and the lower edges are formed into a curved shape.

First Embodiment

Figure 2:
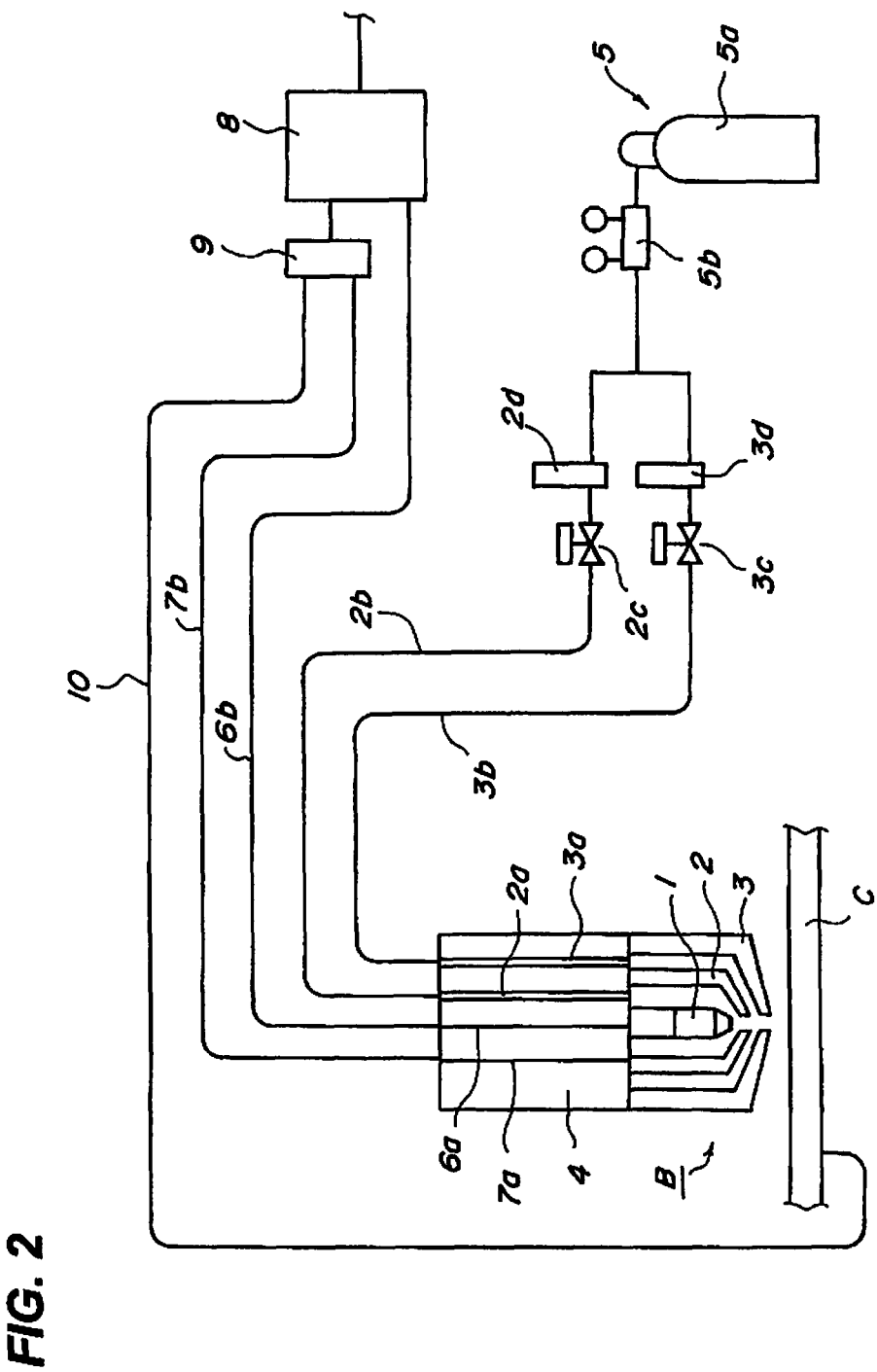
FIG. 2 is a schematic view for explaining a structure of a plasma torch.
Figure 3:
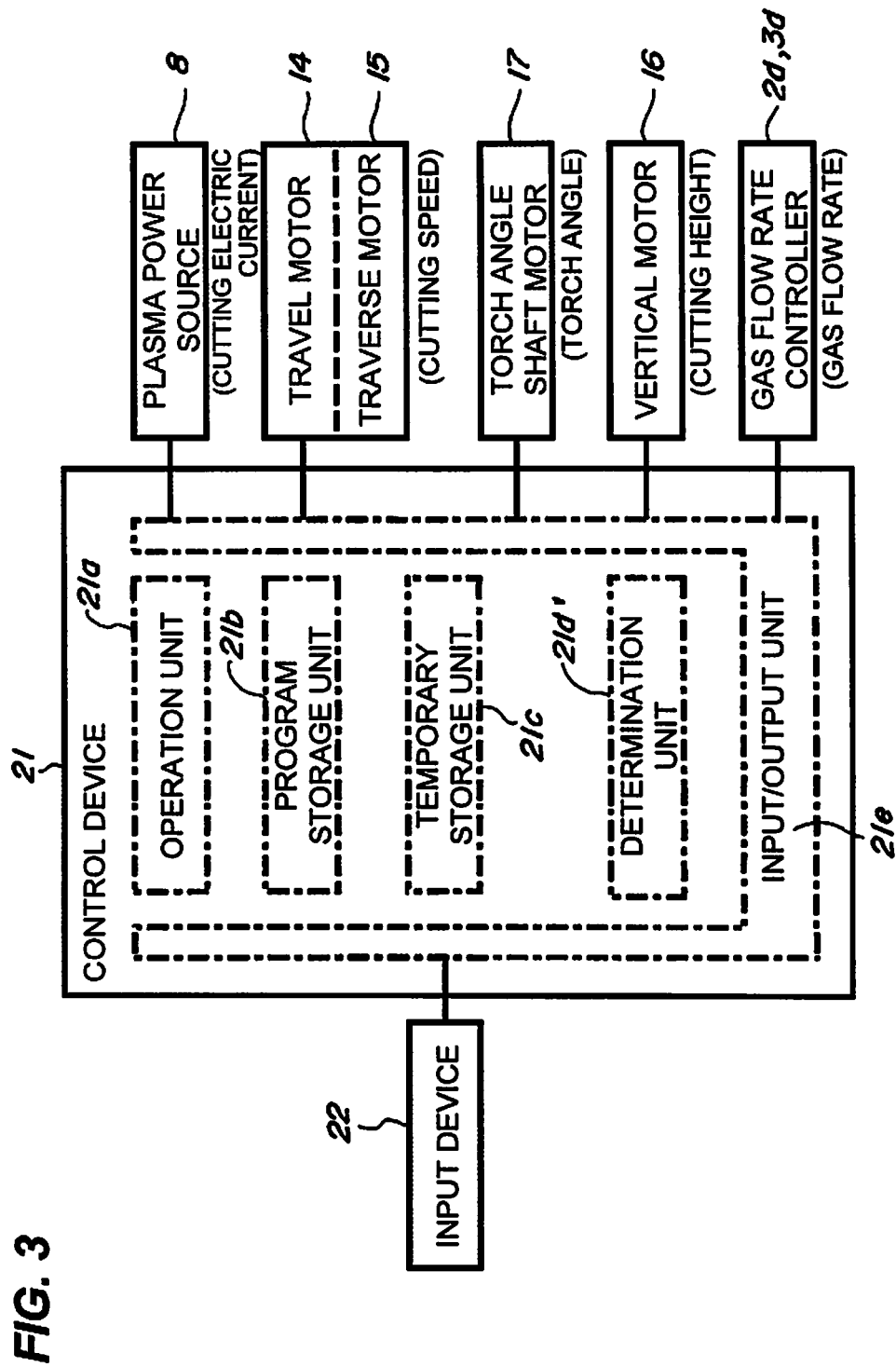
FIG. 3 is a block diagram of a control system.

A preferred embodiment of a cutting apparatus according to the present invention will be described below with reference to the drawings, and also the cutting method will be described. FIG. 1 is a schematic view illustrating a structure of a cutting apparatus. FIG. 2 is a schematic view for explaining a structure of a plasma torch. FIG. 3 is a block diagram of a control system. FIG. 4 is a view for explaining the shape of a cutting plane when a cutting object is cut.

Figure 4A:
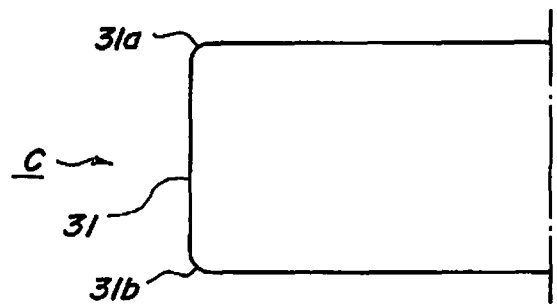
FIG. 4 is a view for explaining a shape of a cutting plane when a cutting object is cut.

Firstly, the shape of a cutting plane when a cutting object C is cut by a plasma torch B in a cutting apparatus A will be described with reference to FIG. 4. FIG. 4A illustrates that the cutting object C is cut in such a manner that an upper edge 31a and a lower edge 31b of a cutting plane 31 are R-cut in a curved shape. The radius of the curved surface at each edge 31a and 31b is not particularly limited. The upper edge 31a and the lower edge 31b may have the curved surface from which a coated film is difficult to be separated, when the cutting plane is subject to coating. The radius of the curved surface has to be at least 2 mm to 3 mm, and the upper edge and the lower edge may have the curved surface with the radius greater than the radius described above.

Figure 4B:
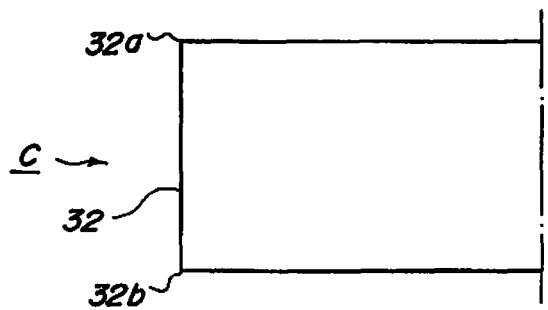

FIG. 4B illustrates a cutting plane 32 obtained by usual vertically cutting the cutting object C. The upper edge 32a and the lower edge 32b of the cutting plane 32 are required to be at right angles.

Figure 4C:
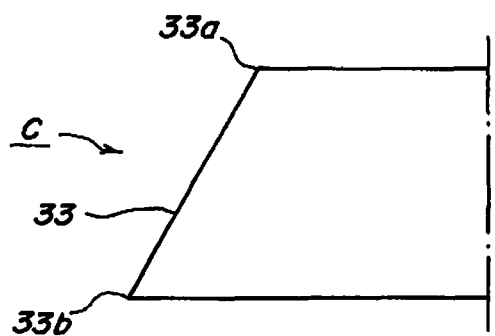

FIG. 4C illustrates a cutting plane 33 obtained by bevel-cutting the cutting object C with a predetermined angle. The cutting plane 33 is formed to have a tilt surface having an angle that is set in accordance with the thickness of the cutting object C. The upper edge 33a and the lower edge 33b are required to be an acute edge having a compound angle of the set angle and the right angle.

Next, the structure of the cutting apparatus A and the structure of the plasma torch B will be described with reference to FIGS. 1 to 3.

As illustrated in FIG. 2, the plasma torch B has an electrode 1 arranged at its center. A nozzle 2 and a shield nozzle 3 are provided around the electrode 1. The electrode 1, the nozzle 2, and the shield nozzle 3 are detachably mounted to the torch body 4. A flow path 2a of plasma gas formed on the torch body 4 is opened between the electrode 1 and the nozzle 2. A flow path 3a of shield gas formed on the torch body 4 is also opened between the nozzle 2 and the shield nozzle 3.

Although not shown, the electrode 1 and the nozzle 2 are cooled by water in order to change the cutting condition.

A hose 2b is connected to the flow path 2a of the plasma gas formed on the torch body 4. This hose 2b is connected to an electromagnetic valve 2c and a flow rate controller 2d. Similarly, a hose 3b, which is connected to an electromagnetic valve 3c and a flow rate controller 3d, is connected to the flow path 3a of the shield gas. The flow rate controllers 2d and 3d are fed with gas from a gas feeding device 5 that includes a tank 5a, industrial pipe, and pressure controller 5b.

The flow rate controllers 2d and 3d are configured to function as a gas flow rate control device that varies the flow rate to be supplied in accordance with a signal from a control device 21 described later.

A conductive member 6a arranged at the torch body 4 is connected to the electrode 1. A conductive member 7a similarly arranged at the torch body 4 is connected to the nozzle 2. The conductive member 6a is connected to a power source 8 via a cabtire 6b, while the conductive member 7a is connected to a changeover member 9 via a cabtire 7b, and further connected to the power source 8. The cutting object C is connected to the changeover member 9 via a cabtire 10, and further connected to the power source 8.

The power source 8 is configured to be capable of varying the value of the current to be applied to the electrode 1 in accordance with the signal from the control device 21 described later.

In the plasma torch B thus configured, the gas feeding device 5 is operated beforehand to feed gas that is adjusted to a set pressure, the electromagnetic valve 2c is opened to feed plasma gas between the electrode 1 and the nozzle 2, and after a preflow is executed for a predetermined time, the electrode 1 and the nozzle 2 are energized to form pilot arc. The pilot arc is ejected toward the cutting object C. When the arc is brought into contact with the cutting object C, the electromagnetic valve 3c is opened to feed the shield gas between the nozzle 2 and the shield nozzle 3, and at the same time, the changeover member 9 is operated to allow electric current to flow between the electrode 1 and the cutting object C as well as the energization between the electrode 1 and the nozzle 2 is discontinued, whereby a main arc for cutting the cutting object C is formed.

The cutting apparatus A has the plasma torch B mounted thereto, and includes a moving device D that moves the area of the cutting object C. The moving device D includes a pair of rails 11 mounted parallel to each other, a frame 12 with a shape of a gate that has saddles 12a mounted so as to be capable of traveling on the rails 11, and cross guarder 12b arranged in the direction orthogonal to the mounting direction of the rails 11, and a traverse carriage 13 mounted so as to be capable of moving in the lateral direction along the cross guarder 12b of the frame 12.

A travel motor 14 that allows the frame 12 to travel along the rails 11 is provided to the saddle 12a of the frame 12. A traverse motor 15 that moves the traverse carriage 13 in the direction orthogonal to the rails 11 is provided to the traverse carriage 13.

The plasma torch B is mounted to the traverse carriage 13. The traverse carriage 13 is also provided with a vertical motor 16 that moves the plasma torch B in the shaft direction of the plasma torch B so as to allow the plasma torch B to be apart from or close to the cutting object C, and a torch angle shaft motor 17 that inclines the plasma torch B so as to correspond to the target bevel angle.

Accordingly, the torch angle shaft motor 17 and the vertical motor 16 are driven to adjust the tilt angle and the height of the plasma torch B to the cutting object C, and then, the travel motor 14 and the traverse motor 15 are controlled to be driven in synchronism with each other, whereby the plasma torch B can be moved two-dimensionally.

A control board 18 having incorporated therein a control device described later is illustrated in FIG. 1. The gas feeding device 5 that feeds the gases to the plasma torch B and the power source 8 that flows electric current between the electrode 1 and the cutting object C are not provided to the frame 12, but arranged at a predetermined position near the rails 11. Further, the moving device D in the present invention does not necessarily require a gate-like frame 12. The moving device D can assume any structure so long as it can move the plasma torch B two-dimensionally in order to cut the cutting object C into plural members without lifting the plasma torch B from the cutting object C.

Next, the control device that controls the cutting apparatus A according to the present embodiment will be described with reference to FIG. 3. In FIG. 3, the control device 21 includes an operation unit 21a, a program storage unit 21b into which a program for the cutting and the cutting conditions for cutting the cutting planes 31 to 33 shown in FIG. 4 are written, a temporary storage unit 21c that temporarily stores the information of the cutting start position and cutting end position of the member that is to be cut from the cutting object C, information of the cutting object, such as the thickness of the cutting object C, and information input from the input device 22, like a keyboard used by operator and a data port through which outside data is input, including the information relating to the cutting area, and a determination unit 21d that determines the information relating to the cutting area input from the input device 22 so as to determine whether the next cutting area is the area to be R-cut, the area to be vertically cut, or the area to be bevel-cut.

The input device 22 is composed of, for example, a keyboard or the like, and it inputs the information of the member cut from the cutting object C or the information that affects the cutting condition including the thickness. The information input from the input device 22 is transmitted through the input/output unit 21e.

The cutting condition written in the program storage unit 21b includes the cutting electric current applied to the electrode 1 of the plasma torch B, the cutting speed corresponding to the thickness of the cutting object C, the height of the plasma torch B from the cutting object C, the tilt angle of the plasma torch B, and the flow rate of the plasma gas fed between the electrode 1 and the nozzle 2 of the plasma torch B. The individual data composing the cutting conditions is written in a matrix set for every thickness of the cutting object C and every shape of the cutting planes 31 to 33 shown in FIG. 4.

Therefore, when the information of the thickness of the cutting object C and the information of the cutting planes 31 to 33 are input from the input device 22, the data of the cutting conditions corresponding to the input information is read, and the flow rate controllers 2d and 3d, the power source 8, and the motors 14 to 17 are independently or synchronously driven based on the data.

The value when the cutting object C is vertically cut as shown in FIG. 4B becomes reference data of the cutting conditions for the cutting object C. The cutting conditions for bevel-cutting the cutting object C as shown in FIG. 4C includes the bevel angle by which the tilt angle of the plasma torch B is designated, the height of the plasma torch B corresponding to the distance of the plasma torch B from the cutting object C according to the tilt of the plasma torch B, and the cutting speed corresponding to the apparent thickness in accordance with the bevel angle.

As described above, in the cutting condition required for the vertical cutting and the cutting condition required for the bevel-cutting are different in the tilt angle of the plasma torch B, the height of the plasma torch B from the cutting object C, and the cutting speed, but are the same in the other conditions, i.e., the cutting electric current and the flow rate of the plasma gas.

When the cutting plane 31 is formed by R-cutting the cutting object C as shown in FIG. 4A, at least one condition selected from the cutting electric current, cutting speed, height of the plasma torch B, angle of the plasma torch B, and flow rate of the plasma gas, is changed with respect to the reference data. For example, in the case of the cutting electric current, the cutting electric current is changed so as to increase from the cutting electric current for the vertical cutting, whereby the R-cutting can be realized. In the case of the cutting speed, the cutting speed is similarly changed so as to increase, whereby the R-cutting can be realized. In the case of the height of the plasma torch B, the height is changed so as to increase, the R-cutting can be realized. In the case of the angle of the plasma torch B, the plasma torch B is inclined so as to enter the product side from the front surface to the backside surface of the cutting object C (in such a manner that the cutting plane is inclined in the direction reverse to the tilt direction shown in FIG. 4C), whereby the R-cutting can be realized. In the case of the flow rate of the plasma gas, the flow rate is changed so as to increase, whereby the R-cutting can be realized.

When the R-cutting is executed as described above, at least one cutting condition may be changed. However, the changed condition is not limited to one, but two or three cutting conditions may simultaneously be changed. For example, the cutting electric current is increased as well as the angle of the plasma torch B is changed. Alternatively, the flow rate of the plasma gas is increased in addition to the above-mentioned two cutting conditions, whereby the R-cutting can be realized in which the upper edge 31a and the lower edge 31b of the cutting plane 31 is stably formed into a curved shape.

In the cutting apparatus A according to the present embodiment, the input device 22 inputs beforehand the path information of the plasma torch B along the target shape that is to be cut from the cutting object C, and the information of the vertical-cutting area, bevel-cutting area, and R-cutting area in the path of the plasma torch B. The input path information and the cutting area information are transmitted to the control device 21, and then, temporarily stored in the temporary storage unit 21c.

When the information indicating that the cutting has to be started is input from the input device 22, the determination unit 21d determines whether the area to be cut is the vertical-cutting area, the bevel-cutting area, or the R-cutting area, in accordance with the information. The determination unit 21d reads the matrix of the cutting condition according to the determination result from the program storage unit 21b, and controls the plasma power source 8, the torch angle shaft motor 17, the vertical motor 16, and the gas flow rate controllers 2d and 3d in accordance with the read data. At the same time, the drives of the travel motor 14 and the traverse motor 15 are controlled based on the path information of the plasma torch B.

The determination unit 21d sequentially determines whether the next cutting area is the vertical-cutting area, the bevel-cutting area, or the R-cutting area, reads the matrix of the cutting condition in accordance with the determination result, and controls the plasma power source 8, the torch angle shaft motor 17, the vertical motor 16, and the gas flow rate controllers 2d and 3d so as to correspond to the read cutting condition.

Accordingly, even when the vertical-cutting area, the bevel-cutting area, and the R-cutting area are mixedly present on one cutting path (cutting line), the determination unit 21d in the control device 21 can make a correct determination, whereby the required vertical cutting, bevel cutting, and R-cutting can be executed while continuously cutting the respective cutting areas based on the determination result.

INDUSTRIAL APPLICABILITY

According to the cutting method of the present invention, the upper and the lower edges of the cutting plane can be formed into a curved shape. Therefore, the formed coated film is not separated from the edges. Accordingly, the present invention is effectively applicable to cut a member constituting an iron and steel structure that needs coating.

The cutting apparatus according to the present invention can continuously execute the vertical-cutting, the bevel-cutting, and R-cutting in order to cut the cutting object C. Therefore, the cutting apparatus according to the present invention is effectively applicable to realize the cutting method described above.

The invention claimed is:
1. A cutting method for cutting at least one of an upper edge portion and a lower edge portion on an object to be cut into a curved shape outer surface portion adjacent to a vertical outer surface portion of a cutting plane of the object using a plasma torch, said cutting method comprising the steps of:
previously storing, as reference data, a cutting condition including a cutting electric current to be applied to an electrode of the plasma torch, a flow rate of a plasma gas supplied by the plasma torch, a moving speed of the plasma torch, a height of the plasma torch from the object to cut and tilt angle of the plasma torch with respect to the object to be cut;
inputting information concerning areas to be cut of the object;
determining an area of the object where at least one of the upper edge portion and the lower edge portion of the cutting plane of the object is cut into a curved shape outer surface portion in the object to be cut based on the input information concerning areas to be cut of the object;
providing the plasma torch adjacent to the object to be cut;
providing the plasma gas to a periphery of an electrode of the plasma torch;
ejecting a plasma arc from a nozzle of the plasma torch; and
forming the at least one of the upper edge portion and lower edge portion of the cutting plane into the curved shape outer surface portion by changing at least one condition selected from the cutting electric current, the flow rate of the plasma gas, the moving speed of the plasma torch, the height of the plasma torch and tilt angle of the plasma torch, which are previously stored as the reference data, when the determined area of the object to be cut is cut;
wherein said step of forming the curved shape outer surface portion includes increasing the flow rate of the plasma gas.

* * * * *